United States Patent
Rafiee et al.

(10) Patent No.: US 12,164,272 B2
(45) Date of Patent: Dec. 10, 2024

(54) VIRUS CONTROL BUILDING MANAGEMENT SYSTEM

(71) Applicant: ABB Schweiz AG, Baden (CH)

(72) Inventors: Mehran Rafiee, Balbriggan (IE); Sean Giblin, Lucan (IE); Brendan Collins, Portmarnock (IE); Paul Cowling, Castlebellingham (IE); Dan Landers, Woodstock, GA (US); Maciej Skrzyniarz, Minska (PL); Gabriel Rosu, Dublin (IE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/167,775

(22) Filed: Feb. 4, 2021

(65) Prior Publication Data

US 2022/0244686 A1 Aug. 4, 2022

(51) Int. Cl.
| | |
|---|---|
| *G05B 15/02* | (2006.01) |
| *F24F 11/52* | (2018.01) |
| *F24F 11/64* | (2018.01) |
| *G06Q 10/02* | (2012.01) |
| *G06Q 10/0631* | (2023.01) |
| *F24F 120/10* | (2018.01) |

(52) U.S. Cl.
CPC ............ *G05B 15/02* (2013.01); *F24F 11/52* (2018.01); *F24F 11/64* (2018.01); *G06Q 10/02* (2013.01); *G06Q 10/06311* (2013.01); *F24F 2120/10* (2018.01)

(58) Field of Classification Search
CPC . G05B 15/02; F24F 11/64; F24F 11/52; F24F 2120/10; F24F 11/0001; F24F 11/30; G06Q 10/02; G06Q 10/06311
See application file for complete search history.

(56) References Cited

U.S. PATENT DOCUMENTS

| | | | |
|---|---|---|---|
| 5,326,028 A | * | 7/1994 | Kano ................. G01D 5/26 356/627 |
| 6,369,716 B1 | | 4/2002 | Abbas et al. |
| 6,916,239 B2 | | 7/2005 | Siddaramanna et al. |
| 7,396,212 B1 | | 7/2008 | Parker et al. |
| 8,086,352 B1 | | 12/2011 | Elliott |
| 8,100,746 B2 | | 1/2012 | Heidel et al. |

(Continued)

FOREIGN PATENT DOCUMENTS

| | | |
|---|---|---|
| CN | 110696857 A | 1/2020 |
| CN | 210050954 U | 2/2020 |

(Continued)

OTHER PUBLICATIONS

Jiang, C., Masood, M.K., Soh, Y.C. and Li, H., 2016. Indoor occupancy estimation from carbon dioxide concentration. Energy and Buildings, 131, pp. 132-141. (Year: 2016).*

(Continued)

*Primary Examiner* — Alicia M. Choi

(74) *Attorney, Agent, or Firm* — Greenberg Traurig, LLP

(57) ABSTRACT

A building management system is provided. The building management system uses a ventilation system to exchange air within a room in the building. A controller uses a sensor to determine a property about the room and operates the ventilation system in response thereto. The controller also operates an indicator to provide the users with the status of the room.

17 Claims, 3 Drawing Sheets

(56) References Cited

U.S. PATENT DOCUMENTS

| | | | |
|---|---|---|---|
| 8,536,998 B1 | 9/2013 | Siu et al. | |
| 8,622,314 B2 | 1/2014 | Fisher et al. | |
| 9,182,751 B1 | 11/2015 | Reeder | |
| 9,303,890 B2 | 4/2016 | Haines et al. | |
| 9,423,779 B2 | 8/2016 | Agarwal | |
| 9,528,715 B2 | 12/2016 | Aiken | |
| 10,139,380 B2 | 11/2018 | Abehessera et al. | |
| 10,145,831 B2 | 12/2018 | Angeli et al. | |
| 10,353,362 B2 | 7/2019 | Thomas | |
| 10,410,504 B2 | 9/2019 | Tabe | |
| 10,443,873 B1 | 10/2019 | Johnson et al. | |
| 10,503,847 B2 | 12/2019 | Hoff | |
| 10,613,504 B2 | 4/2020 | Chowdhury | |
| 2007/0008064 A1* | 1/2007 | Donohue | F24F 11/54 340/3.7 |
| 2010/0305761 A1* | 12/2010 | Remsburg | F24F 11/0008 700/277 |
| 2013/0127620 A1* | 5/2013 | Siebers | A61B 5/1113 340/573.1 |
| 2013/0245837 A1 | 9/2013 | Grohman | |
| 2014/0244043 A1 | 8/2014 | Foster | |
| 2014/0244298 A1* | 8/2014 | Robinson | G16H 40/20 705/3 |
| 2015/0168003 A1 | 6/2015 | Stefanski et al. | |
| 2015/0204551 A1 | 7/2015 | Nair et al. | |
| 2015/0330817 A1* | 11/2015 | Law | G16Z 99/00 702/19 |
| 2016/0116512 A1* | 4/2016 | Ji | F24F 11/30 702/61 |
| 2016/0195856 A1 | 7/2016 | Spero | |
| 2016/0209065 A1* | 7/2016 | Hagström | G05B 15/02 |
| 2016/0370029 A1* | 12/2016 | Kurelowech | F24F 12/006 |
| 2016/0377305 A1 | 12/2016 | Kwa | |
| 2017/0030605 A1 | 2/2017 | Heller et al. | |
| 2017/0049915 A1* | 2/2017 | Brais | H05B 47/115 |
| 2018/0299153 A1* | 10/2018 | Ajax | F24F 11/0001 |
| 2019/0172165 A1* | 6/2019 | Verteletskyi | H04L 69/08 |
| 2019/0196432 A1* | 6/2019 | Morley | G05B 19/0428 |
| 2019/0209806 A1* | 7/2019 | Allen | A61M 21/02 |
| 2019/0240362 A1* | 8/2019 | Corsetti | E05B 1/0069 |
| 2019/0338976 A1* | 11/2019 | Chakraborty | F24F 11/64 |
| 2019/0376712 A1* | 12/2019 | Miwa | F24F 11/62 |
| 2021/0048206 A1* | 2/2021 | Forzani | F24F 11/77 |
| 2021/0052758 A1* | 2/2021 | Brais | A61L 2/10 |
| 2021/0090417 A1* | 3/2021 | Bailey | H05B 47/155 |
| 2021/0199360 A1* | 7/2021 | Watanabe | F25B 49/02 |
| 2021/0313075 A1* | 10/2021 | Mc Namara | G08B 21/22 |
| 2021/0356153 A1* | 11/2021 | Nesler | F24F 11/0001 |
| 2021/0390812 A1* | 12/2021 | Chaurasia | G07C 9/27 |
| 2022/0042694 A1* | 2/2022 | He | F24F 11/88 |
| 2022/0113050 A1* | 4/2022 | Douglas | G05B 15/02 |
| 2022/0154958 A1* | 5/2022 | Manoharan | G06Q 10/0635 |

FOREIGN PATENT DOCUMENTS

| | | | |
|---|---|---|---|
| DE | 4427356 A1 | 1/1996 | |
| DE | 102021128678 A1 * | 5/2022 | |
| EP | 2272731 A3 | 7/2012 | |
| EP | 2357419 B1 | 10/2016 | |
| EP | 3147880 A1 | 3/2017 | |
| EP | 2357420 B1 | 1/2018 | |
| EP | 3316583 A1 | 5/2018 | |
| WO | 2006099337 A3 | 9/2006 | |
| WO | 2006107308 A1 | 10/2006 | |
| WO | 2007073477 A2 | 6/2007 | |
| WO | 2007104240 A1 | 9/2007 | |
| WO | 2008088020 A1 | 7/2008 | |
| WO | 2011020058 A1 | 2/2011 | |
| WO | 2011022379 A1 | 2/2011 | |
| WO | 2012053230 A1 | 2/2012 | |
| WO | 2013177290 A3 | 11/2013 | |
| WO | 2014006293 A1 | 1/2014 | |
| WO | 2014041896 A1 | 3/2014 | |
| WO | 2014063201 A1 | 5/2014 | |
| WO | 2014123531 A1 | 8/2014 | |
| WO | 2017142346 A1 | 8/2014 | |
| WO | 2015006777 A3 | 1/2015 | |
| WO | 2015095753 A1 | 6/2015 | |
| WO | 2015130019 A1 | 9/2015 | |
| WO | 2015134755 A3 | 9/2015 | |
| WO | 2016100138 A1 | 6/2016 | |
| WO | 2016116784 A1 | 7/2016 | |
| WO | 2016126363 A1 | 8/2016 | |
| WO | 2016141199 A1 | 9/2016 | |
| WO | 2017083134 A1 | 5/2017 | |
| WO | 2017172123 A1 | 10/2017 | |
| WO | 2018035161 A1 | 2/2018 | |
| WO | 2018039433 A1 | 3/2018 | |
| WO | 2018098301 A1 | 5/2018 | |
| WO | 2018148420 A1 | 8/2018 | |
| WO | 2018191635 A1 | 10/2018 | |
| WO | 2018191703 A1 | 10/2018 | |
| WO | 2019014671 A1 | 1/2019 | |
| WO | 2019136097 A1 | 7/2019 | |
| WO | 2019148074 A1 | 8/2019 | |
| WO | 2019152996 A1 | 8/2019 | |
| WO | 2019164804 A1 | 8/2019 | |
| WO | 2020117973 A1 | 6/2020 | |
| WO | 2020146766 A1 | 7/2020 | |
| WO | WO-2021195538 A1 * | 9/2021 | |
| WO | WO-2022026366 A1 * | 2/2022 | |

OTHER PUBLICATIONS

Ke, Y.P. and Mumma, S.A., 1997. Using carbon dioxide measurements to determine occupancy for ventilation controls. (Year: 1997).*

Bosch.IO, "Smart buildings and the future of work in the post-COVID world", https://bosch.io/resources/on-demand-webinar/smart-buildings-and-the-future-of-work/, Aug. 5, 2020, (9 pp).

Umwelt-Campus Birkenfeld, "COVID-19 prevention: CO2 measurement and demand-oriented ventilation", http://www.umwelt-campus.de/forschung/projekte/iot-wekstatt/ideen-sur-corona-krise, Mar. 17, 2021, (18 pp).

Fraunhofer, IBP-Bericht 001/2010/283 "IBP-Bericht 001/2010/283", Dec. 31, 2009, (194 pp).

"Indoor Air Quality (IAQ)", https:///www.vaisala.com/en/industries-applications/hvac-construction-material-and-artifact-monitoring/indoor-air-quality, 2021, (5 pp).

haustex.de, "Carbon dioxide in indoor air: monitoring protects health", https://www.haustec.de/klima-lueftung/Queftungstechnik/kohlendioxid-der-raumluft-ueberwachen-bewahrt-gesundheit?page=all, Aug. 12, 2020, (10 pp).

Schwee, Jens Hjort, et al.Scientific Data, "Room-level occupant counts and environmental quality from heterogeneous sensing modalities in a smart building", www.nature.com/scientificdata, https://doi.org/10.1038/s41597-019-0274-4, 2019, (11 pp).

SafeCount, "Live occupancy monitoring solution", https://www.irisys.net/products/safecount-occupancy-monitoring-solution?utm_source=adwords&utm_medium=cpc&utm_campaign=safecount&utm, Mar. 17, 2021, (12 pp).

* cited by examiner

VIRUS CONTROL BUILDING MANAGEMENT SYSTEM

BACKGROUND

The present inventions relate generally to building management systems, and more particularly, to a building management system for providing safe rooms to reduce the spread of viruses.

The Covid-19 pandemic of 2020 has raised significant safety concerns due to the contagious nature of this virus and its potentially deadly consequences. One solution that has been widely adopted is mask wearing and social distancing. This effort has been moderately successful in reducing the spread and exposure to the virus. However, mask wearing and social distancing can be difficult to practice in some settings such as indoor offices, and particularly conference rooms and the like. Moreover, even where mask wearing and social distancing are practiced in such environments, occupants may still feel unsafe in indoor environments since masks and social distancing cannot completely prevent the transmission of all viruses. Thus, improved building systems would be desirable that can more effectively reduce the spread of viruses between occupants.

SUMMARY

A building management system is described for minimizing the spread of viruses between occupants of a room in a building. The system includes a ventilation system that supplies fresh air to the room and removes old air. A sensor measures a property which is used by a controller to operate the ventilation system. An indicator is also provided that may be observed by users in order to determine the status of the room. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
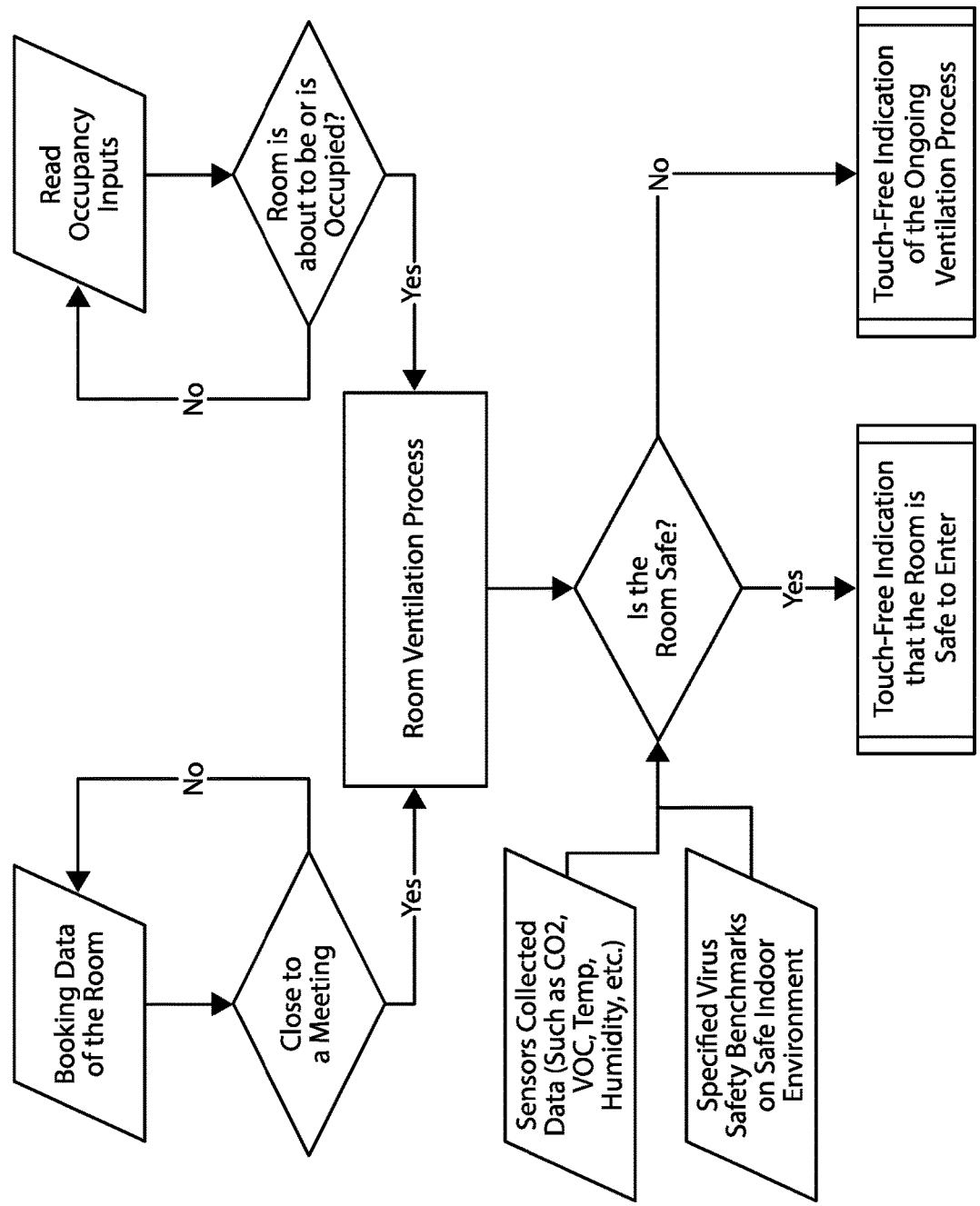
FIG. 1 is a flow chart of one algorithm for a ventilation system to prepare a safe room.

In the described Building Management System (BMS) room sensors may be used in an automation system to control rooms within the building to provide a safe environment for users of the rooms. Providing a safe indoor environment in rooms, workplaces and buildings may be more challenging when there are additional restrictions required due to a pandemic or epidemic, such as spread of Covid-19 during 2020. Two safety considerations are particularly important to ensure a safe indoor environment during a pandemic, which includes providing safe and healthy air to breath in a room, and having enough space available in the room to maintain safe physical distancing. In system and method described herein may be especially helpful in providing a safe indoor environment despite risks associated a single or multiple viruses.

Although building systems exist to manage air quality in buildings, systems do not currently exist with the ability to indicate and/or provide a safe indoor environment against a single or multiple viruses, such as Covid-19, etc., either in touch-free or touch system configurations. Conventional and currently available room sensor systems typically require physical interaction with the users of the rooms. For example, a user may need to physically touch the sensor to engage the screen (if any), adjust set points, change viewing parameters, initiate overrides, review the indicators, etc. Moreover, room sensor systems currently available in the market are not able to provide a safe indoor environment and/or specific information and/or indications regarding the safety status of a room based on governmental or medical safety guidelines and benchmarks for specified viruses, such as Covid-19.

The intelligent pandemic safe room system described herein may be used in a touch-free safe mode which is not presently available. By activating this mode, the system may sense room data, such as temperature, humidity, volatile organic compounds (VOC), carbon dioxide ($CO^2$) levels, Bluetooth Low Energy (BLE) strength, etc. The system also communicates with a room controller as a part of the building management system (BMS). The controller may then use programmed algorithms to take measures to control room safety and provide indicators to users of the rooms. Thus, the system may provide a safe indoor environment against pandemic-causing viruses while offering a safe touch-free user interaction with the sensors, indicators and user interfaces. User interaction may be performed through a dedicated smart phone app, BLE, voice recognition, hand gestures or any other means to communicate without physical contact. Moreover, a clear touch-free feedback may be displayed by the system to the user to indicate the safety status of the room under various circumstances considering virus specific safety benchmarks, e.g., Covid-19, and compliance with such safety benchmarks for both indoor air health/safety and physical distancing standards. Thus, the system may provide an easy to understand display to the user that indicates whether safe and healthy air is provided in the room or not and/or whether there is enough space in the room to maintain safe physical distancing by users or not.

The pandemic safe room system may be able to control the environment of a room before a room is occupied and while a room is occupied. In one possible mode, touch-free operation of the room is possible with auto-initiation safe preparation of the room by the BMS before and even after a room is occupied. This may be implemented through an elevated air-exchange initiation to refresh the air in the room when it is unoccupied and to increase air flow velocities within the room. This may be set up to be in compliance with a virus specific safety benchmark on safe indoor environment requirements to reduce virus transmission risk. In addition, when a user is approaching the room, a safety indicator installed outside the room may also indicate the status of system and whether it is safe to enter the room or not through an obvious visual indication, such as multi-colored LEDs (e.g., red, green, etc). This may also be reported to the user through a phone app indication. The safety status of the room may also be used to manage the room entrance door, e.g., access to the room may not be granted when the room is not safe to enter.

In another possible mode, a touch-free indication of room safety may be displayed when a room is occupied. This may be done with an intelligent Machine Learning algorithm to estimate whether there is enough room available for the occupants in the space to maintain safe physical distancing to minimize the spread of any virus. The system preferably indicates whether the room is safe or not through an obvious visual indication, such as multi-colored LEDs (e.g., red, green, etc), a phone app, etc. The system may also provide internal contact tracing to determine who an infected person came into contact with. To review additional room parameters, users of the rooms may interact with the system through a phone app, Bluetooth, BLE, voice recognition, physical gestures, or other touch-free communication methods which may reduce the potential for any contamination of the user interface (e.g., a touchscreen), indicator, sensor, occupant's bodies, etc. and any subsequent cross contamination of the occupants.

One algorithm that may be implemented by the system is shown in FIG. 1. The algorithm allows for a touch-free operation of the room, which may be controlled by a user as well as providing safe preparation of the room by the BMS system before and even after a room is occupied to ensure the air is safe considering the specified virus safety benchmarks on safe indoor environments. The algorithm can initiate the control process based on the inputs and parameters for various cases. For example, in one case, meeting and conference rooms or the like may be bookable rooms (i.e., through a calendar database for scheduling appointments). The scheduling system may then inform the controller of the scheduled occupy time. The room controller may then ventilate the room air while clearly indicating the process and that the room is not yet fully ventilated. When the room has been ventilated sufficiently to be safe considering the specified virus safety benchmarks on safe indoor environments, the system indicates that the room is ready for occupancy. The user of the room may then enter the room and may adjust the temperature, lights, etc. by using their smart phone, Bluetooth, BLE, voice recognition, hand gestures or other touch-free communication methods.

In another case, rooms may be non-bookable such that use of the room cannot be predicted. In this case, data collected from the room or adjacent thereto may be used to inform the controller about when the room is about to be occupied or about conditions in the room while it is being occupied. For example, data may be obtained from occupancy sensors, such as passive infrared sensors (PIR), lights, a phone app connected to the BMS by Wi-Fi, BLE, etc., or any other data sources and mechanisms to detect occupancy. In response to inputs from the data sources, the controller ventilates the room in the most efficient manner possible, considering that the speed of ventilation may need to be increased, while clearly indicating the process and the room status. When the room is determined to be safe for occupation considering the specified virus safety benchmarks on safe indoor environments, the system may indicate to users that the room is safe. The user of the room may also be allowed to adjust the temperature, lights, etc. using their smart phone, Bluetooth, BLE, voice recognition, hand gestures or any other touch-free methods.

Figure 2:
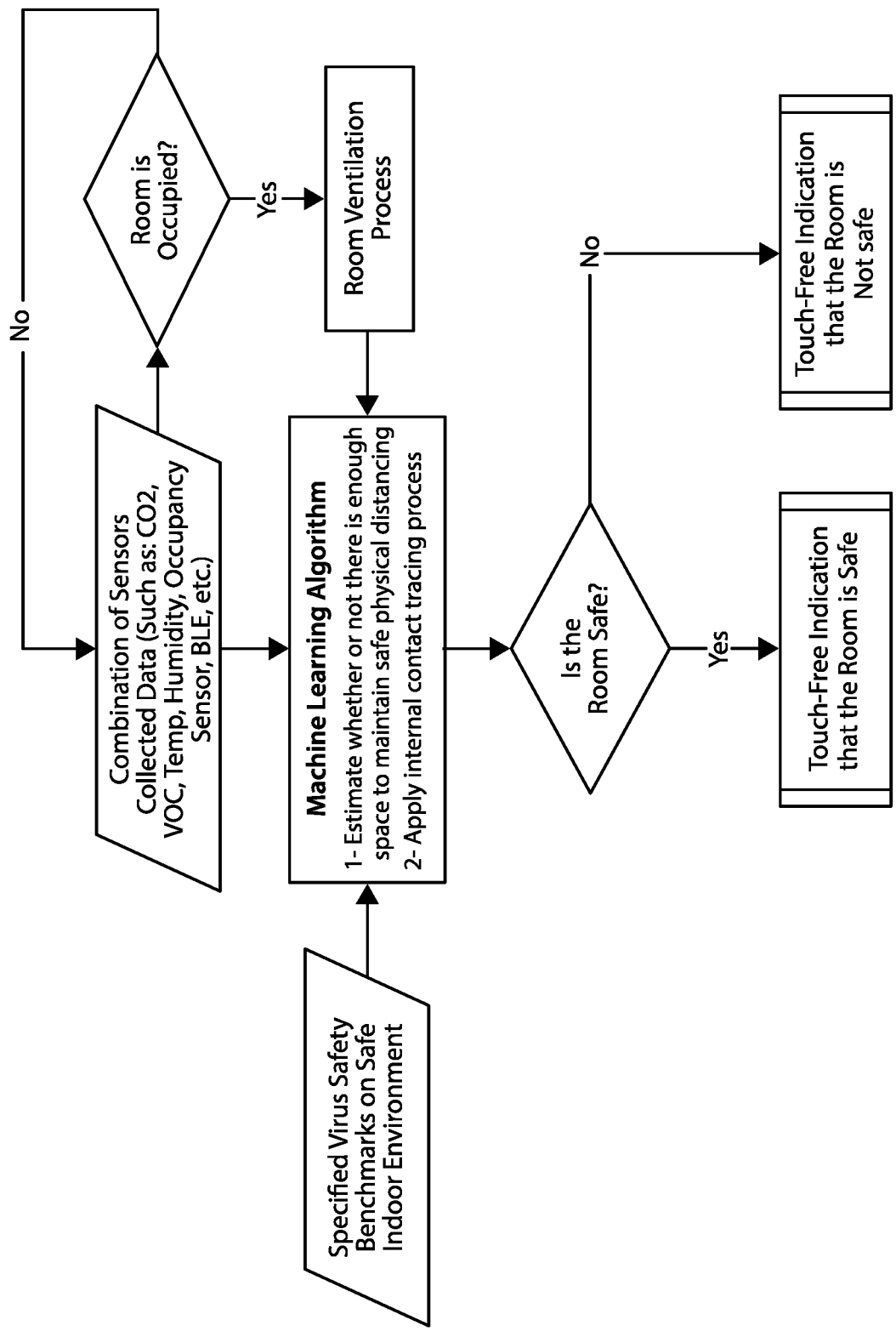
FIG. 2 is a flow chart of another algorithm for determining whether an occupied room is safe.

Another algorithm that may be implemented by the system is shown in FIG. 2. This algorithm may be used to provide a touch-free indication of room safety when a room is occupied. Estimating room occupation may be done by the system using analytical techniques, for example, based on $CO_2$ sensor data. Machine learning, knowledge-based and data-driven methods may also be used to estimate occupancy. Results may also be improved by combining data from multiple sensors, such as PIR, $CO_2$, lighting, temperature, humidity, BLE and Wi-Fi. Although occupancy detection methods have been used for general energy management, currently available algorithms cannot report virus safety levels, such as the safety level of a room with respect to Covid-19, either in a touch or touch-free systems. In the safe room system described herein, data collected from the room and virus safety benchmark data on safe indoor environments (i.e., healthy safe air and safe physical distancing) may be used in an intelligent machine learning algorithm to estimate whether or not there is enough space in an occupied room to maintain safe physical distancing. The safety level may be reported to occupants with a clear touch-free indication. The algorithm may also be able to detect when new users are entering the room as well as their impact on the room virus safety level which is checked and controlled continuously to provide a safe indoor environment. The system may also use internal contact tracing to check and indicate if any occupants have been in contact with an infected person.

The system herein may be especially useful in addressing building safety concerns and making buildings pandemic resistant. One advantage of the system is the use of touch-free and safe user interfaces. Feedbacks via clear room indications, e.g. a room sensor LEDs, phone app, etc., may provide an indication of whether the room is safe or not considering the specified virus safety benchmarks, such as Covid-19 safety benchmarks on safe indoor environments. The indicators may include healthy safe air and physical distancing indications. Clear and visual touch-free indications may be provided for virus safety levels of occupied and unoccupied rooms. Real-time indications of the safety level in an indoor environment against viruses may provide increased reassurance. An auditable history of the safety indicators for an indoor environment may also be possible using the BMS system. Ventilation of a room may be initiated in response to detecting the $CO_2$ level as a measure of the room air safety based on a determination of the number of users in the room. Ventilation may also be done automatically after a meeting has been completed (i.e., when the users leave the room) using occupancy sensing and/or a scheduling system. For example, the system may include an automatic unbookable time after each booked meeting during which the room is ventilated. Room history and room safety records may also be retained as a track and trace assistant. For example, the track and trace assistant may include a history of the room $CO_2$ level and meeting attendees in a report. The system may be especially useful in managing virus occupancy guidelines, for example, Covid-19 occupancy guidelines. Touch-free operation (e.g., via a phone app, Bluetooth, BLE voice recognition, hand gestures or any other touch-free methods) may also be used for temperature setpoint adjustments, lighting, blind control and other room control functions. Room access permission, room air exchange and air velocity may also be controlled. For example, ventilation may be adjusted so that the room supply air/extract fan(s) runs at a higher speed when the room is vacated. Ventilation may run at the highest fan speed for a pre-set period to reduce any virus-related risks, such as Covid-19 related risks. $CO_2$ concentration may also be used to determine ventilation requirements in order to satisfy indoor environment benchmarks.

Figure 3:
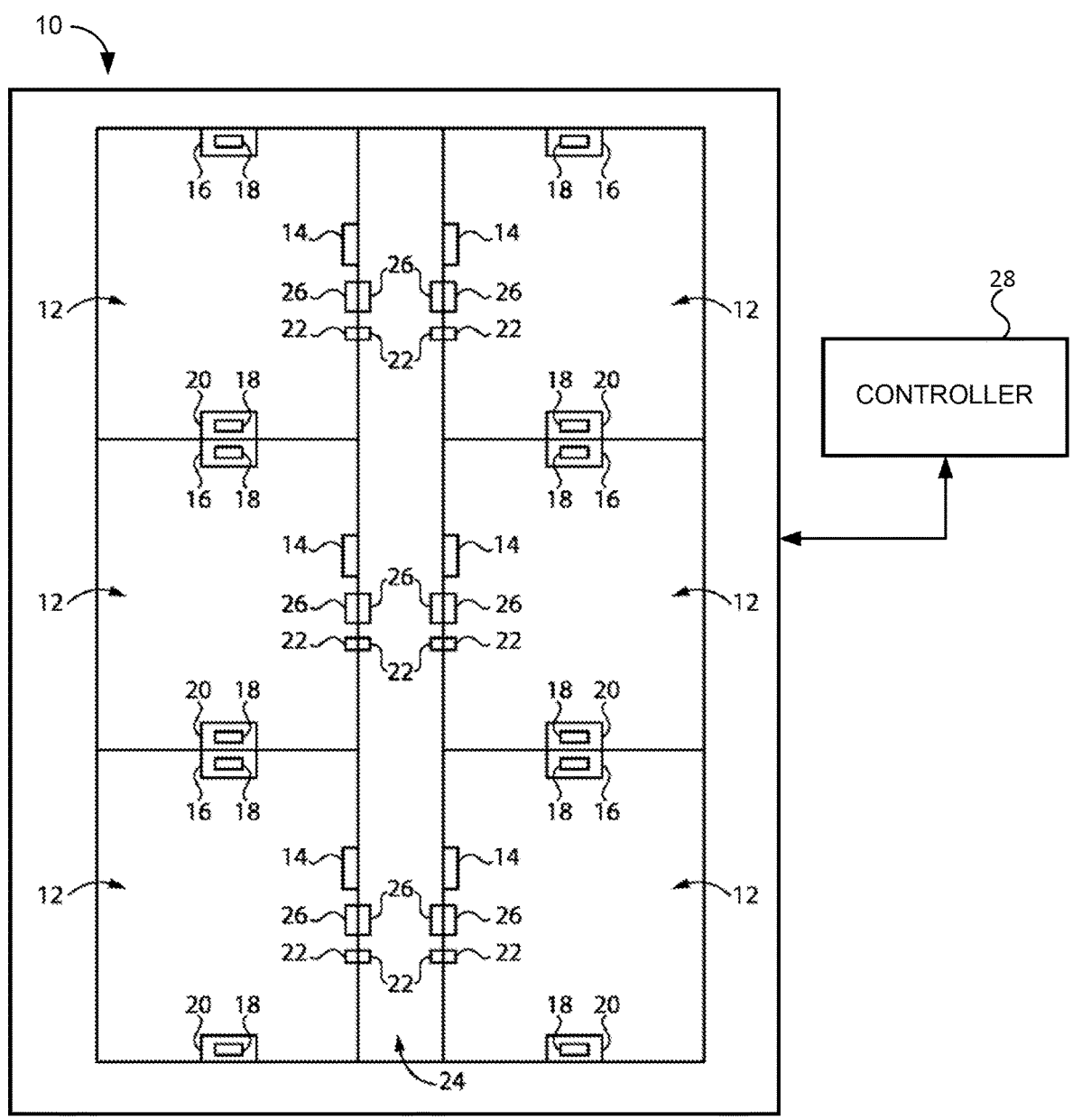
FIG. 3 is a schematic of a building management system.

A schematic of a building 10 with a building management system (BMS) is shown in FIG. 3. As shown, the building 10 has a number of rooms 12, with each room 12 having one or more doors 14 to enter and exit the room 12. A ventilation system 16, 18, 20 is provided to control the environment within each of the rooms 12. For example, each room 12 may have an inlet duct 16 with a fan 18 that supplies fresh air to the room 12 and an outlet duct 20 with a fan 18 that draws air out of the room 12. A sensor 22 may be provided for each of the rooms 12 to monitor various properties indicative of the number of users in the room 12, number of users expected to use the room 12, quality of the air in the room 12, the size of the room 12 relative to the number of users (i.e., space per person), etc. The sensor 22 may be located inside the room 12 or outside the room 12 (e.g., in a hallway 24 near the door 14 or elsewhere). An indicator 26 may also be provided for each of the rooms 12 to provide a visual indication of the safety status of the room 12 which is observable by the users. The indicator 26 may be located inside the room 12 or outside the room 12 (e.g., in the hallway 24 near the door 14 or elsewhere). The controller 28 may communicate through wired or wireless connections with the sensors 22, ventilation system 18, indicators 26, and other data sources and environmental control systems, as described above to ensure that a safe room 12 is provided to the users. For example, the controller 28 may receive the monitored properties from the sensors 22, operate the ventilation system 18, grant room 12 access (e.g., doors 14), and control the indicators 26 in response thereto as described above to provide safe rooms 12.

The sensors 22 may monitor properties in the rooms or may collect other data about the rooms, building and/or users. For example, the sensors 22 may include a temperature sensor, a humidity sensor, a VOC sensor, a $CO_2$ sensor, a BLE sensor, a voice recognition module, a PIR sensor, a WiFi device or phone app. Preferably, the sensors 22 are non-contact sensors that do not require the user to contact a surface that is also contacted by other users. The indicators 26 are also preferably non-contact indicators that do not require the user to contact a surface that is also contacted by other users in order to view the status of the indicator. For example, the indictors 26 may be multi-colored lights where a green light is visible when the room 12 is safe, a blue light is visible when ventilation is in process in the room 12, and a red light is visible when the room 12 is not ready to be occupied. Similar status information may also be reported to the user through a phone app. The controller 28 preferably determines the number of users that will be occupying the room 12 and/or the number of users currently occupying the room 12. The controller 28 may also determine a size of the room 12 relative to the number of users that will be occupying the room 12 and/or the number of users currently occupying the room 12 (i.e., space per person). The controller 28 may also have access to a calendar database that schedules appointments of the users for the rooms 12. In response to the number of users, space per person and/or calendar database, the controller 28 may operate the ventilation system 18 and the indicators 26 to ensure a safe room 12 for the users. For example, the ventilation system 18 may be operated in response to the number of users, space per person and/or calendar database. The indictors 26 may also be operated in response to the number of users, space per person and/or calendar database. Preferably, the controller 28 operates the ventilation system 18 individually for each of the rooms 12. It is also preferred for the controller 28 to have access to a medical safety benchmark for a virus such that the controller 28 operates the ventilation system 18 and/or indicators 26 in response to the properties collected by the sensors 22 and the medical safety benchmark.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A building management system, comprising:
   a plurality of rooms;
   a ventilation system exchanging air with the plurality of rooms;
   a sensor monitoring one or more properties for each of the plurality of rooms; and
   a non-contact indicator installed at the plurality of rooms and observable by one or more users of the plurality of rooms to provide a visual indication of a safety status of the plurality of rooms,
   wherein the non-contact indicator does not require input from the one or more users to display a status of the non-contact indicator;
   a medical safety benchmark for a virus; and
   a controller receiving the one or more properties and the medical safety benchmark and operating the ventilation system and the non-contact indicator in response to the one or more properties and the medical safety benchmark, the controller operating the ventilation system individually for each of the plurality of rooms;
   wherein for a room of the plurality of rooms, the room comprises:
   a $CO_2$ sensor configured to measure a $CO_2$ level of the room,
   wherein the sensor comprises the $CO_2$ sensor, and
   wherein the controller, based on the $CO_2$ level in the room monitored by the $CO_2$ sensor, determines a number of the one or more users in the room,
   the controller determining, based on the medical safety benchmark, an amount of space in the room available to maintain a predetermined physical distance between at least two users in the room to determine whether to grant access to the room, and
   wherein the controller, based on the medical safety benchmark, controls a ventilation of the room in response to the number of the one or more users determined to be in the room.

2. The building management system according to claim 1, wherein the sensor further comprises one or more of a temperature sensor, a humidity sensor, a volatile organic compounds sensor, a Bluetooth Low Energy sensor, a voice recognition module, a passive infrared sensor, or a WiFi device or phone app.

3. The building management system according to claim 1, wherein the sensor is a non-contact sensor.

4. The building management system according to claim 1, wherein the non-contact indicator comprises a multi-colored light.

5. The building management system according to claim 4, wherein the multi-colored light of the non-contact indicator comprises:
   a first color light,
   wherein the first color light is indicative that the room is safe,
   a second color light, wherein the second color light is indicative that ventilation is in process in the room, and
a third color light,
wherein the third color light is indicative that the room is not ready to be occupied.

6. The building management system according to claim 1, further comprising a calendar database for scheduling appointments of the one or more users for the plurality of rooms, the controller further operating the ventilation system in response to the calendar database.

7. The building management system of claim 1, wherein the controller is configured to determine a number of the one or more users to occupy or occupying the plurality of rooms based on the monitoring by the sensor; and
wherein the controller is configured to operate the ventilation system to adjust ventilation in each of the plurality of rooms based on the medical safety benchmark for a virus and in response to the number of the one or more users to occupy or occupying the plurality of rooms.

8. The building management system of claim 7, wherein the controller is configured to operate the ventilation system at a higher speed when the room is vacated.

9. A pandemic safe room system, comprising:
a plurality of rooms;
a ventilation system exchanging air individually with each of the plurality of rooms;
a medical safety benchmark for a virus;
a non-contact sensor for each of the plurality of rooms monitoring one or more properties;
a non-contact indicator installed adjacent to the non-contact sensor for each of the plurality of rooms and observable by a plurality of users of the plurality of rooms to provide a visual indication of a safety status of the plurality of rooms,
wherein the non-contact indicator does not require input from one or more users to display a status of the non-contact indicator; and
a controller receiving the one or more properties from the non-contact sensor and having access to the medical safety benchmark;
wherein the controller operates the ventilation system and the non-contact indicator in response to the one or more properties and the medical safety benchmark, the controller operating the ventilation system individually for each of the plurality of rooms; and
wherein for a room of the plurality of rooms, the non-contact sensor comprises a $CO_2$ sensor configured to measure a $CO_2$ level of the room and the controller is configured to, based on the $CO_2$ level of the room monitored by the $CO_2$ sensor, determine a number of the one or more users in the room based on the $CO_2$ level monitored by the $CO_2$ sensor,
wherein the controller is configured to determine, based on the medical safety benchmark, an amount of space in the room available to maintain a predetermined physical distance between at least two users in the room to determine whether to grant access to the room, and
wherein the controller is configured to, based on the medical safety benchmark, control a ventilation of the room based on the number of the one or more users determined to be in the room and the medical safety benchmark.

10. The pandemic safe room system according to claim 9, wherein the non-contact sensor further comprises a temperature sensor, a humidity sensor, a volatile organic compound sensor, a Bluetooth Low Energy sensor, a voice recognition module, a passive infrared sensor, or a WiFi device or phone application.

11. The pandemic safe room system according to claim 9, wherein the non-contact indicator comprises a multi-colored light.

12. The pandemic safe room system according to claim 9, further comprising a calendar database for scheduling appointments of the one or more users for the plurality of rooms, the controller further operating the ventilation system in response to the calendar database.

13. The pandemic safe room system according to claim 9, wherein the non-contact sensor comprises one or more of a temperature sensor, a humidity sensor, a volatile organic compound sensor, the $CO_2$ sensor, a Bluetooth Low Energy sensor, a voice recognition module, a passive infrared sensor, or a WiFi device or phone app, and the non-contact indicator comprises a multi-colored light.

14. The pandemic safe room system according to claim 9, wherein the controller is configured to determine a number of users to occupy or occupying each of the plurality of rooms based on the monitoring by the non-contact sensor; and
wherein the controller is configured to operate the ventilation system to adjust ventilation in each of the plurality of rooms based on the medical safety benchmark for a virus and in response to the number of users to occupy or occupying each of the plurality of rooms.

15. The pandemic safe room system according to claim 14, wherein the controller is configured to initiate the ventilation of one of the plurality of rooms based on the number of users to occupy or occupying the one of the plurality of rooms and based on a $CO_2$ level of the one of the plurality of rooms; and
wherein the controller is configured to operate the ventilation system by adjusting supply air and extract fan speeds based on the $CO_2$ level and indoor environment benchmarks.

16. The pandemic safe room system according to claim 14, wherein the controller is configured to operate the ventilation system at higher speeds when the one of the plurality of rooms is vacated.

17. The pandemic safe room system according to claim 9, wherein the non-contact indicator is located outside each of the plurality of rooms.

* * * * *